(12) United States Patent
Keti et al.

(10) Patent No.: US 12,332,360 B2
(45) Date of Patent: Jun. 17, 2025

(54) SYSTEM AND METHOD FOR SURVEYING A NON-STATIONARY PLATFORM SUBJECT TO THERMAL EXPANSION

(71) Applicant: Raytheon Company, Waltham, MA (US)

(72) Inventors: Matt Keti, Alta Loma, CA (US); Jason Burke, Placentia, CA (US)

(73) Assignee: Raytheon Company, Arlington, VA (US)

( * ) Notice: Subject to any disclaimer, the term of this patent is extended or adjusted under 35 U.S.C. 154(b) by 371 days.

(21) Appl. No.: 18/066,395

(22) Filed: Dec. 15, 2022

(65) Prior Publication Data

US 2024/0201397 A1    Jun. 20, 2024

(51) Int. Cl.
*G01S 19/41* (2010.01)
*G01S 19/15* (2010.01)

(52) U.S. Cl.
CPC .............. *G01S 19/41* (2013.01); *G01S 19/15* (2013.01)

(58) Field of Classification Search
CPC ................................ G01S 19/41; G01S 19/15
USPC ................................................... 342/357.24
See application file for complete search history.

(56) References Cited

U.S. PATENT DOCUMENTS 9,829,582 B2    11/2017   Wu et al.
10,551,196 B2    2/2020   Wu et al.
10,716,086 B2 *   7/2020   Del Regno ........... G01S 19/071
2021/0372793 A1 * 12/2021   Nikulin .................. G05D 1/106
2021/0396523 A1   12/2021   Wu et al.

OTHER PUBLICATIONS

Yi et al., "Recent research and applications of GPS based technology for bridge health monitoring", Science China Technological Sciences, vol. 53, No. 10, Oct. 2010, 14 pages.
Anko Maritime, "Position and Attitude Control", 2021, 1 page.
Yu et al., "Global Navigation Satellite System-based positioning technology for structural health monitoring: a review", Struct. Control Health Monit., vol. 27, Issue 1, Jan. 2020, 27 pages.
Suárez et al., "GNSS-RTK Dynamic Checking of Positioning and Navigation Systems onboard Marine Seismic Vessels in Venezuela", PDVSA, International Association of Geodesy, Aug.-Sep. 2009, 1 page.

* cited by examiner

*Primary Examiner* — Harry K Liu

(57) ABSTRACT

A method includes obtaining an initial survey of multiple receivers located on a dynamic platform. The method also includes obtaining sensor readings from the multiple receivers. The method further includes validating, using a differential calculator, the initial survey by (i) selecting a reference receiver and a target receiver from among the multiple receivers and (ii) calculating, based on the sensor readings and baselines between the reference receiver and one or more remaining receivers, a platform attitude, platform thermal expansion state, and survey error values corresponding to the target receiver. The method also includes, starting from a validated survey, adding a new receiver to the initial survey by (i) determining a baseline between the reference receiver and the new receiver and (ii) associating the baseline to a coordinate frame of the initial survey.

20 Claims, 7 Drawing Sheets

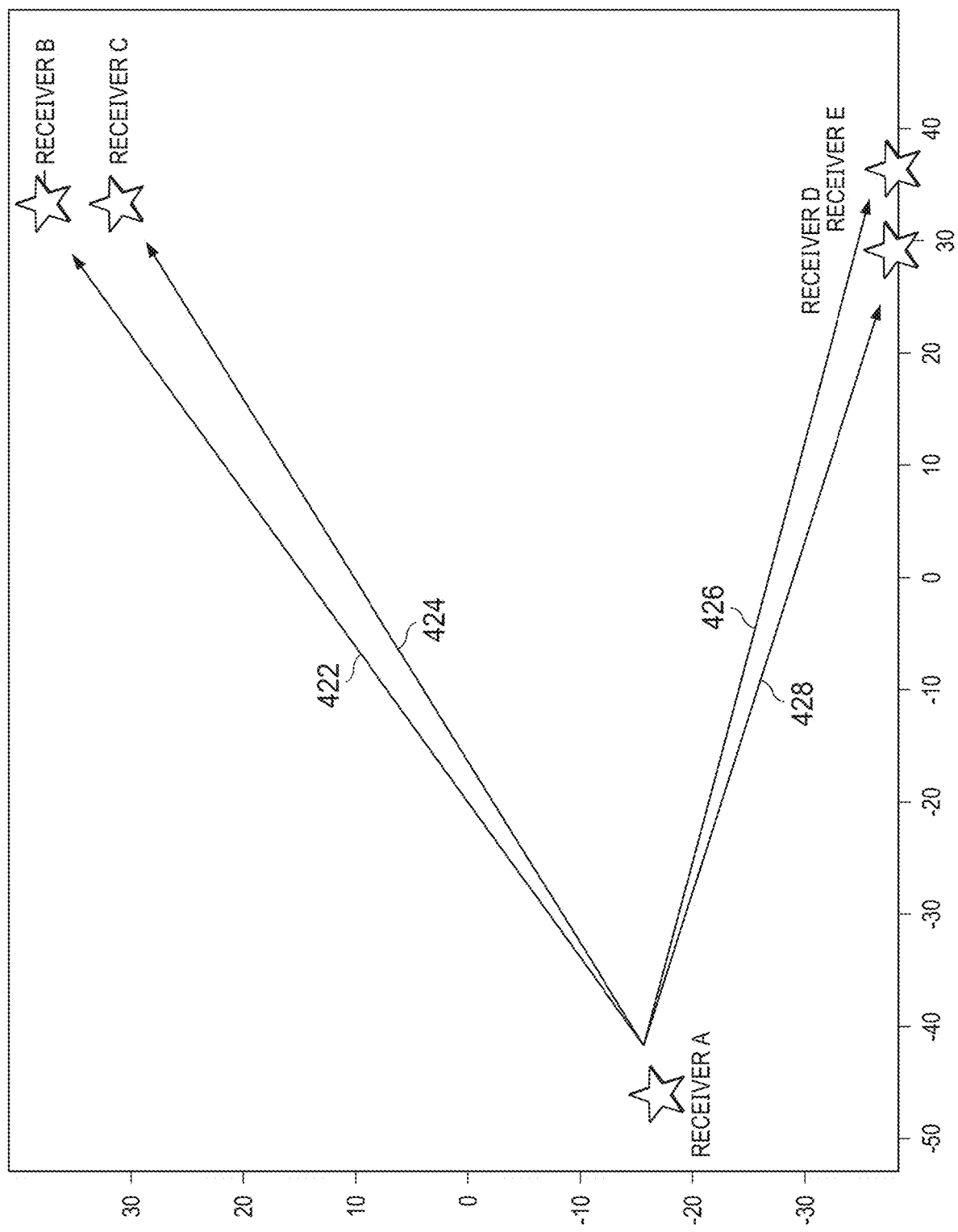

SYSTEM AND METHOD FOR SURVEYING A NON-STATIONARY PLATFORM SUBJECT TO THERMAL EXPANSION

GOVERNMENT RIGHTS

This invention was made with government support under contract number N00019-19-C-0020 awarded by the United States Navy. The government has certain rights in the invention.

TECHNICAL FIELD

This disclosure is generally directed to global navigation satellite systems. More specifically, this disclosure is directed to a system and method for surveying a non-stationary platform subject to thermal expansion.

BACKGROUND

The use of the Global Positioning System (GPS) or other Global Navigation Satellite Systems (GNSSs) for safety-critical, high-availability air navigation missions can be challenging due to movement and thermal expansion of certain platforms. Thermal expansion poses a severe challenge to the deployment of differential GNSS navigation systems, which require precisely-surveyed GNSS antennas. Without proper mitigation, thermal expansion can pose threats to GNSS-based navigation safety for both manned and unmanned aerial platforms since it can lead to erroneous range estimates due to mischaracterization of differential signal delays between a reference system and a user.

SUMMARY

This disclosure is directed to a system and method for surveying a non-stationary platform subject to thermal expansion.

In a first embodiment, a method includes obtaining an initial survey of multiple receivers located on a dynamic platform. The method also includes obtaining sensor readings from the multiple receivers. The method further includes validating, using a differential calculator, the initial survey by (i) selecting a reference receiver and a target receiver from among the multiple receivers and (ii) calculating, based on the sensor readings and baselines between the reference receiver and one or more remaining receivers, a platform attitude, platform thermal expansion state, and survey error values corresponding to the target receiver.

In a second embodiment, a non-transitory computer readable medium contains instructions that when executed cause at least one processor to obtain an initial survey of multiple receivers located on a dynamic platform. The medium also contains instructions that when executed cause the at least one processor to obtain sensor readings from the multiple receivers. The medium further contains instructions that when executed cause the at least one processor to validate, using a differential calculator, the initial survey. The instructions that when executed cause the at least one processor to validate the initial survey include instructions that when executed cause the at least one processor to (i) select a reference receiver and a target receiver from among the multiple receivers and (ii) calculate, based on the sensor readings and baselines between the reference receiver and one or more remaining receivers, a platform attitude, platform thermal expansion state, and survey error values corresponding to the target receiver.

In a third embodiment, a device includes at least one processing device configured to obtain an initial survey of multiple receivers located on a dynamic platform. The at least one processing device is also configured to obtain sensor readings from the multiple receivers. The at least one processing device is further configured to validate, using a differential calculator, the initial survey. To validate the initial survey, the at least one processing device is configured to (i) select a reference receiver and a target receiver from among the multiple receivers and (ii) calculate, based on the sensor readings and baselines between the reference receiver and one or more remaining receivers, a platform attitude, platform thermal expansion, and survey error values corresponding to the target receiver.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4A and 4B illustrate an example method for survey validation and related results according to this disclosure;

DETAILED DESCRIPTION

Figure 1:
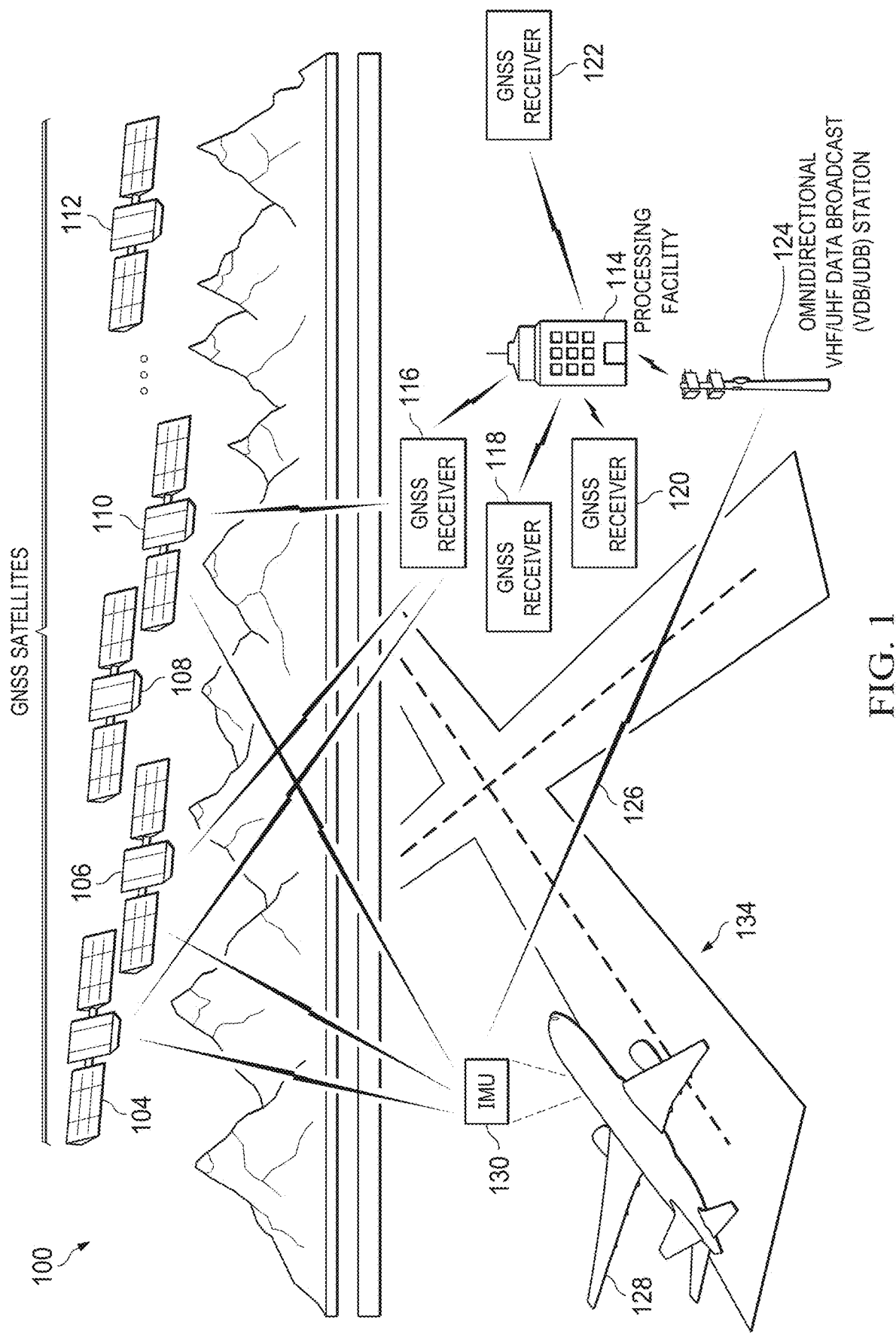
FIG. 1 illustrates an example system for processing geo-spatial positioning data according to this disclosure.

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, the use of the Global Positioning System (GPS) or other Global Navigation Satellite Systems (GNSSs) for safety-critical, high-availability air navigation missions can be challenging due to movement and thermal expansion of certain platforms. Thermal expansion poses a severe challenge to the deployment of differential GNSS 10 navigation systems, which require precisely-surveyed GNSS antennas. Without proper mitigation, thermal expansion can pose threats to GNSS-based navigation safety for both manned and unmanned aerial platforms since it can lead to erroneous range estimates due to mischaracterization of differential signal delays between a reference system and a user.

A differential GNSS augmentation system installed on a non-stationary platform, such as a large ship or other structure, requires a GPS sensor and an inertial measurement unit (IMU) be surveyed in order to relate sensor locations to a reference point and centerline of the platform's body-frame. This allows measurements to be mathematically translated to that reference point, which enables a straightforward navigation solution computation and a measurement comparison for the purposes of integrity monitoring. During the installation phase, the sensor survey is used to align IMUs to the body frame, which is a process often referred to as "IMU boresighting." The survey can be performed using an optical instrument such as a total station, which is a surveying device that integrates an electronic theodolite with an electronic distance meter or laser range finder. A survey team starts from a reference levelling block within the platform and works toward the sensors in multiple survey legs. GPS sensor survey errors led to inaccurate IMU boresight solutions and incorrect measurement translations, diminishing performance of the system after deployment.

One example error in a survey can come from optical survey techniques. In a survey, reference reflectors are positioned in key areas of a platform. Each time the optical measuring equipment is set up at a target location, angular and linear distances are measured from the optical measuring equipment at the target location to the reference reflectors. Measurements from each location are merged by aligning the measured reflectors. The optical survey technique is performed initially for many GNSS installations. However, if a GNSS receiver position is disrupted or it is desired to install new equipment, the entire optical survey needs to be re-performed, including initial measurements, due to the thermal expansion and other dynamics of the platform. In some approaches, the optical survey is performed in the middle of the night, ideally where thermal activity is at a minimum, which may be inconvenient to the overall project.

Some approaches to validate sensor positions and orientations use team recorded data from a known GNSS receiver on land and calculate a difference between the known GNSS data and data from receivers installed on a vessel to validate the outputs of the GNSS gyrocompass and navigation systems at sea. Other approaches perform GNSS-based ship attitude validation using multiple receivers installed on the hull of a vessel. However, such approaches remain vulnerable to effects of thermal expansion, which can cause the locations of the GNSS receivers to vary on the platform.

In another approach for sensor position accuracy, a Real-Time Sensor Installation Monitor (RSIM) is used to conduct the GNSS survey. RSIM involves aligning an IMU sensor frame to a frame of a GNSS receiver installation, namely to perform IMU boresighting. RSIM is used to calculate the GNSS-based orientation of the platform in question and compares the GNSS-based orientation to an IMU-based platform orientation. Any observed differences are used to rotate the IMU frame to match. In a secondary mode, if the IMU has already been boresighted, an inverse process is possible where GNSS baselines can be calculated in global coordinates and then rotated into the platform body frame using the IMU orientation. However, RSIM relies on previously boresighted IMUs, which may not yet be reliable or even available on the platform in question.

In still another approach, Fully Automatic Survey Technology (FAST) is used to conduct the GNSS survey. FAST involves automatically surveying an installation of receivers in a static setting, such as an airfield. Once receivers are placed in their desired locations and the system is activated, GNSS receiver baselines are automatically calculated with no intervention from a user or survey team. However, if used for aircraft approach and landing, the support of a survey team is required to measure baselines from a system GNSS receiver to desired landing areas. Since FAST was designed for static settings, FAST cannot be used on platforms that may be subject to dynamic changes.

This disclosure provides systems and methods for surveying non-stationary platforms subject to thermal expansion. Among other things, the disclosed embodiments do not require a static ground reference. Also, the disclosed embodiments can be used for additional survey activity, not just monitoring platform attitude. The estimation of thermal expansion coefficients enables this capability. The disclosed embodiments further utilize multiple GNSS receivers and can compensate for thermal expansion. Among other things, this is accomplished by detecting and (if necessary) correcting survey errors during equipment installation using the GNSS receivers themselves in order to enable appropriate actions to be taken. For example, if errors are detected, a survey team may be recalled to re-survey a vessel or system prior to deployment. The disclosed embodiments also account for the fact that the platform is not static or stationary. The disclosed embodiments provide thermal expansion compensation that adjusts for unmodeled changes in known equipment locations, which can be detrimental to platform dynamics estimation as well as to the survey. Depending on the materials involved, relatively large linear expansion, such as on the order of four centimeters per one hundred meters of material length, may be expected, which may be substantial to this precision activity. Embodiments of this disclosure can be applied to any dynamic platform, such as ships and rooftops subject to sway and expansion. Depending on the platform and environmental conditions, the disclosed systems and methods may also be run in several other modes that support features such as automatic equipment installation or periodic survey accuracy monitoring. In addition, embodiments of this disclosure provide for validating and maintaining surveys on these non-stationary platforms. In some implementations, optical survey results can be confirmed using an independent GNSS-based technique, and surveys can automatically be extended to new equipment without the need to recall a survey team to re-survey the entire platform.

FIG. 1 illustrates an example system 100 for processing geospatial positioning data according to this disclosure. In some embodiments, the system 100 can include or be part of a Ground Based Augmentation System (GBAS). However, the system 100 can include or be a part of any other suitable system(s). As shown in FIG. 1, the system 100 includes a plurality of reference receivers 116-122, which may be located in an area around an airport or another suitable location. The reference receivers 116-122 are configured to receive geospatial positioning data from GNSS satellites 104-112, which are configured to generate or otherwise provide geospatial positioning data.

The reference receivers 116-122 send measurements to a processing facility 114, which uses these measurements to formulate differential corrections and error bounds for the GNSS satellites 104-112, which are tracked by the reference receivers 116-122. Each of the reference receivers 116-122 is precisely surveyed, enabling the processing facility 114 to determine errors in geospatial positioning signals being received from the GNSS satellites 104-112 by the reference receivers 116-122 and calculate current platform coordinate data. Satellite and receiver measurements can be monitored for potential faults, and measurements with detected faults can be removed from the differential corrections. The processing facility 114 transmits these differential corrections, error bounds, ranging measurements, other platform coordinate data, or other approach data to a rover, such as an aircraft 128, via any suitable technique. In some cases, the information can be transmitted using a VHF Data Broadcast (VDB) or UHF Data Broadcast (UDB) 126 transmitted by a VDB/UDB station 124.

In some embodiments, the aircraft 128 includes a navigation system and an IMU 130 or an inertial navigation system (INS), which is a combination of the IMU 130 and a computer configured to perform navigation calculations. The IMU 130 is initialized by aligning the IMU 130 based on the known coordinates of the platform 134, which can be a runway, airfield, carrier deck, helipad, or the like. For example, the INS can communicate with the processing facility 114 and use data from the GNSS satellites 104-112 to initialize the IMU 130 based on the calculated platform coordinate data. In some implementations, platform coordinate data, calculated based on data from the GNSS satellites 104-112, is provided to an operator of the aircraft 128 for input into the IMU 130 in order to initialize the IMU 130 within the INS. The INS is configured to calculate a position and attitude of an aircraft. However, the INS is subject to drift, which occurs based on cumulative errors and aggressive maneuvering of the aircraft.

In some cases, using a survey with thermal compensation in connection with the techniques discussed below provides a validated survey solution without a need to re-survey a platform after the initial survey. This ensures high accuracy for navigation purposes, such as accurate landing of an aerial vehicle (like an air taxi) on a dynamic platform like a ship, building rooftop, or other platform. A validated survey also enables an addition of sensors or devices without requiring an additional survey of the reference receivers 116-122.

Although FIG. 1 illustrates one example of a system 100 for processing geospatial positioning data, various changes may be made to FIG. 1. For example, the system 100 may include any number of GNSS satellites 104-112 or reference receivers 116-122. Also, various components in the system 100 may be combined, further subdivided, replicated, rearranged, or omitted and additional components may be added according to particular needs. In addition, while FIG. 1 illustrates one example operational environment in which geospatial positioning data can be processed, this functionality may be used in any other suitable system.

Figure 2:
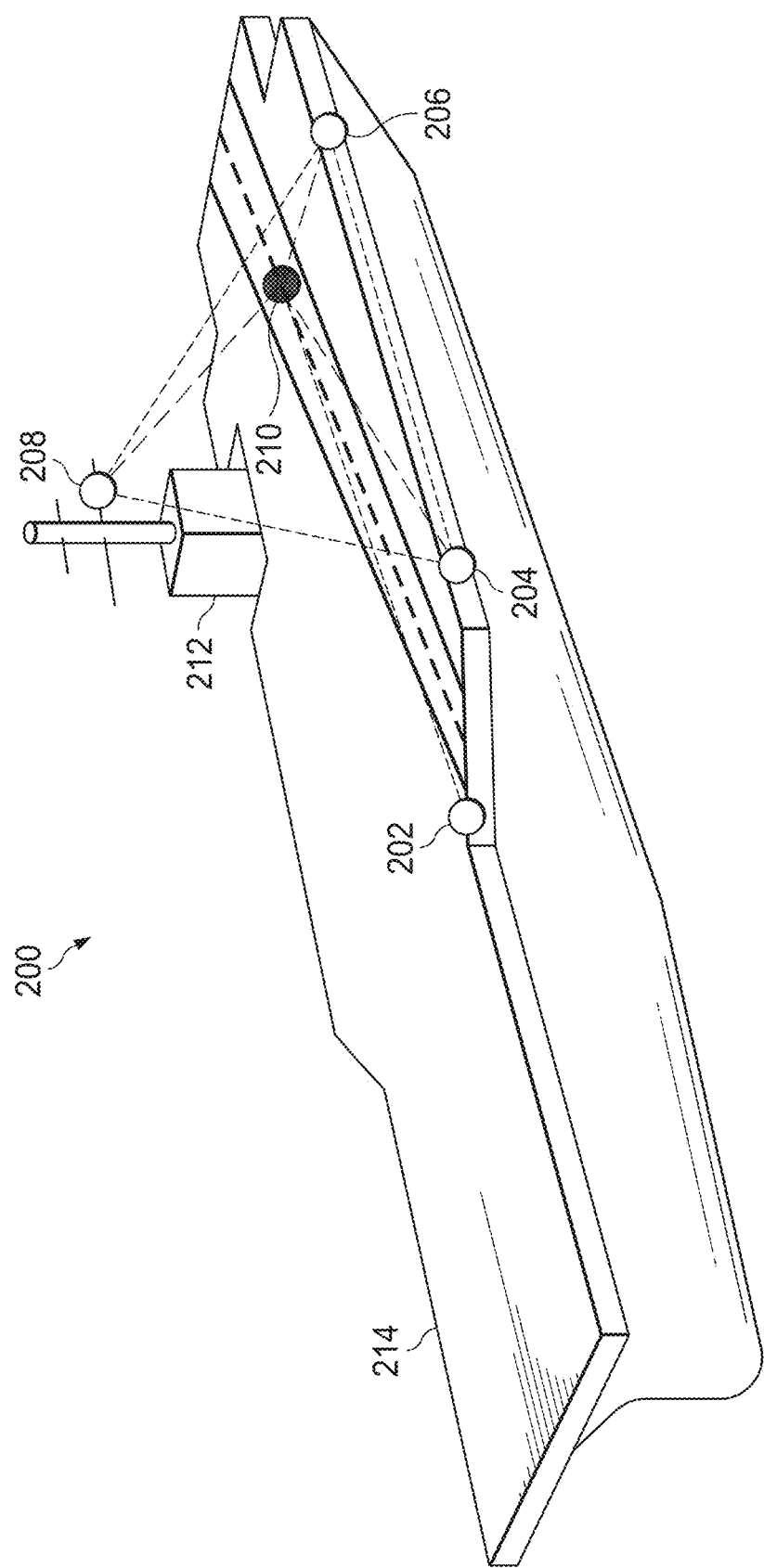
FIG. 2 illustrates an example target receiver verification using a differential global satellite system (DGNSS) according to this disclosure.

FIG. 2 illustrates an example target receiver verification using a differential global satellite system (DGNSS) according to this disclosure. As shown in FIG. 2, a platform 200 represents or includes a dynamic surface configured as a runway platform. The runway platform may be used for fixed-wing aerial platforms performing runway landings. The runway platform may also be used as a landing area for other aerial platforms, such as those with variable approach speeds like helicopters, vertical and/or short take-off and landing (VSTOL) aircraft, or drones. The platform 200 may be on a ship having a hull subject to thermal expansion or atop a building that is subject to sway and thermal expansion.

In the example shown in FIG. 2, the platform 200 includes receivers 202-208. When the receivers 202-208 are installed on the platform 200, an initial platform coordinate frame survey can be performed. The platform coordinate frame survey is often manually performed by setting up optical equipment, such as a total station, at a measuring point 210. From the measuring point 210, a location for each receiver 202-208 is determined by measuring angular and linear distances from the measuring point to a base (mounting) for each receiver 202-208.

An accurate survey (such as a one centimeter-accurate precision survey) between the receivers 202-208 in the platform coordinate frame is used to calculate platform attitude in order to support IMU initialization, navigation data processing, and safety monitoring. However, at the time of the survey, it may be difficult to determine whether one or more structures of the platform 200 are in thermal expansion relative to the start of the survey activity. Because of thermal expansion caused by changing temperatures throughout the day, the optical survey may be performed in a short time window and often very late at night. Additionally, one or more of the receiver locations, such as a location for the receiver 208, can be difficult to survey in a single measurement, and multiple intermediate locations may be established prior to determining the location of the receiver 208. For example, the receiver 208 may located on top of a structure 212, and one or more measurements may be obtained at intermediate locations along the structure 212. As a particular example, the survey equipment may be re-established at a first intermediate location on the structure 212 to either measure the location of the receiver 208 or to establish a second intermediate location, which is then used to further calculate another intermediate location or the location of receiver 208. An error calculating any one of the intermediate locations or while transitioning the survey equipment to one of the intermediate locations can result in a propagation error in the final location of the receiver 208. If survey technicians make a mistake or receivers 202-208 are disturbed, a resultant error is difficult to detect, leading to degraded performance in the deployed system.

In some implementations, a DGNSS survey validation is performed on each of the receivers 202-208 to verify the position of each of the receivers 202-208. A survey error may be detected by assuming that one receiver baseline at a time is in error. For example, the DGNSS survey validation may assume that the location of the receiver 202 is in error and that the locations of the remaining receivers 204-208 are correct. The location of the receiver 202 can be verified by locking down a platform frame 214 based on the receivers 204-208. After a targeted baseline to the receiver 202 is measured, a GNSS measurement double-difference system of equations can be used to estimate (i) the attitude of the platform 200, (ii) its thermal expansion state, (iii) a target baseline survey error, and (iv) a carrier phase measurement ambiguity. Each of these variables can be solved for simultaneously.

If the targeted baseline is in error, a survey error estimate in the x-y-z coordinate plane is significant. For instance, if one or more of the values in the x-y-z coordinate plane exceed a threshold value (such as one centimeter), it may be determined that the initial survey of the location of the receiver 202 was incorrect, and the location of the receiver 202 can be corrected by the calculated x-y-z values in the survey error estimate. Thereafter, the DGNSS survey validation can be performed on another of the receivers 202-208, and this process can be repeated until a location for each receiver 202-208 has been verified or corrected. In some implementations, one or more survey errors can be corrected, and multiple errors can be detected. Also, in some implementations, a report file can be generated for each iteration of the DGNSS survey validation.

Although FIG. 2 illustrates one example of a target receiver verification using a DGNSS, various changes may be made to FIG. 2. For example, the platform 200 may include any number of receivers 202-208. Also, various components in the platform 200 may be combined, further subdivided, replicated, rearranged, or omitted and additional components may be added according to particular needs. In addition, while FIG. 2 illustrates one example operational environment in which DGNSS may be used, this functionality may be used in any other suitable system.

Figure 3:
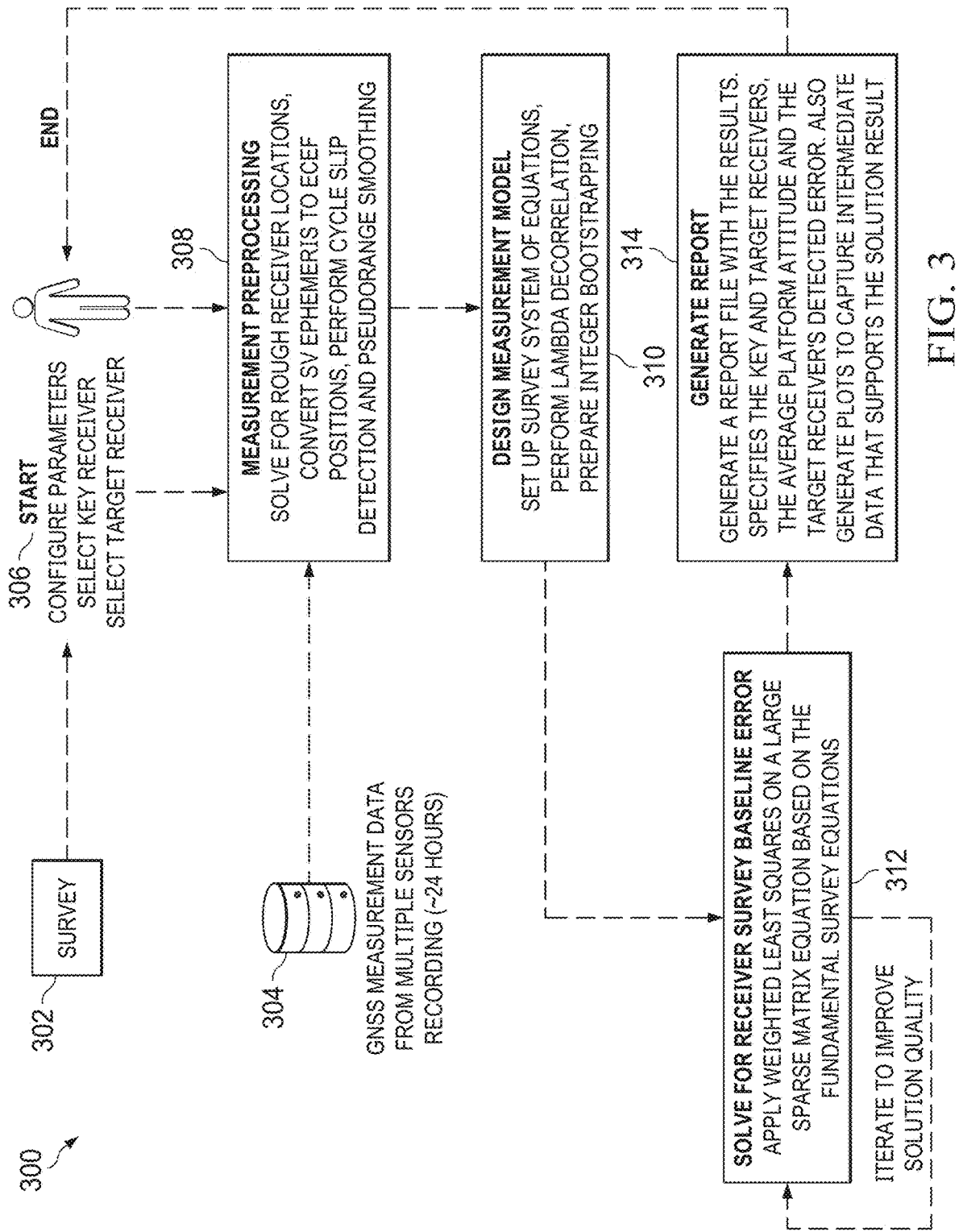
FIG. 3 illustrates an example process for survey validation according to this disclosure.

FIG. 3 illustrates an example process 300 for survey validation according to this disclosure. For ease of explanation, the process 300 is described with respect to the platform 200 of FIG. 2. However, the process 300 could be used with any other suitable platform and any other suitable system.

As shown in FIG. 3, an initial survey data set for the receivers 202-208 positioned on the platform 200 is obtained in step 302. Each receiver 202-208 may include a respective GNSS sensor. The initial survey data set can include three-dimensional coordinate locations for the receivers 202-208 in the platform coordinate frame. In some cases, the initial survey data includes at least four receivers 202-208 arranged in a polygonal shape. Additionally, GNSS measurement data from the receivers 202-208 is obtained in step 304. The GNSS measurement data can be received from the receivers 202-208 over a period of time, such as over a 12-hour or 24-hour period.

In step 306, one or more parameters are configured to commence a test to validate that the survey is free of error (blunder) or disturbance. For example, a key or reference receiver 204 and a target receiver 202 can be selected. The key receiver 204 can be selected for subsequent differential GPS calculations in order to estimate roll-pitch-yaw, thermal expansion coefficients, and blunder vector estimate of the platform 200 over the collected data. The target receiver 202 can be selected to be assumed in error (blundered), and the differential GNSS calculations are performed.

In step 308, measurement preprocessing is performed, such as to (i) solve for rough receiver locations, (ii) convert satellite vehicle (SV) ephemeris to earth-centered earth-fixed (ECEF) positions, and (iii) perform cycle slip detection and pseudorange smoothing. The DGNSS survey validation involves certain fundamental survey equations. As an example, for a given satellite 104 and a given receiver 202, let $\varphi$ be the carrier phase measurement, $\hat{u}_{SV}$ be the unit line-of-sight vector from the receiver 202 to the satellite 104 in the ECEF frame, T be the platform 200 (body) to navigation frame conversion matrix (a function of roll, pitch, and yaw), $C_n^e$ be the navigation-to-ECEF frame conversion matrix, and $\vec{r}$ be the vector from the receiver 202 to the satellite 104 in the frame of the platform 200. A carrier phase measurement can be modeled as follows.

$$\varphi = \hat{u}_{SV} C_n^e T \vec{r} + \lambda N_{real} + \varepsilon_\varphi \quad (1)$$

The variable $\lambda N_{real}$ stands for the signal wavelength multiplied by a real-valued non-integer ambiguity value that does not become integer-valued until the double-differencing step. The examples shown here formulate the observation model in terms of carrier phase, but the same equations hold for pseudo range (except that there is no range ambiguity).

In step 310, a design measurement model is created, such as by (i) setting up a survey system of equations, (ii) performing least-squares ambiguity decorrelation adjustment (LAMBDA) calculations, and (iii) preparing integer bootstrapping. As an example, for two receivers 202-204 and a given satellite 104, let $\vec{R}_0 = \vec{r}_1 - \vec{r}_2$ be the baseline vector between the two receivers 202-204 and $SD = \varphi_1 - \varphi_2$ be the single-difference carrier phase measurement. In the presence of thermal expansion and a survey error, the baseline will be perturbed by some vector $\Delta \vec{R}$. The single-difference measurement may be modeled as follows.

$$SD = \varphi_1 - \varphi_2 \quad (2)$$

$$= \hat{u}_{SV} C_n^e T \vec{r}_1 - \hat{u}_{SV} C_n^e T \vec{r}_2 + \hat{u}_{SV} C_n^e T \Delta \vec{R} + \lambda N'_{real} + \varepsilon_\varphi$$

$$= \hat{u}_{SV} C_n^e T (\vec{R}_0 + \Delta \vec{R}) + \lambda N'_{real} + \varepsilon_\varphi$$

When the platform 200 is a ship, the ship's orientation and baseline perturbation are unknown. In the case of the baseline perturbation, this can be modeled as follows.

$$\Delta \vec{R} = \Delta \vec{R}_S + k_\| (\vec{R}_{0,\|} + \vec{R}_{S,\|}) + k_\perp (\vec{R}_{0,\Psi} + \vec{R}_{S,\perp}) \quad (3)$$

Here, $\Delta \vec{R}_S$ is the small survey error vector in any of the three dimensions, $k_\|$ is the deck horizontal expansion coefficient, $k_\perp$ is the vertical expansion coefficient, the subscript $\|$ denotes the projection of the vector onto the horizontal plane, and the subscript $\perp$ denotes the projection of the vector onto the vertical axis.

In step 312, a receiver survey baseline error is computed. To attempt to solve for the unknowns, the measurement model can be linearized around the estimated platform state roll, pitch, yaw, and zero baseline perturbation. In some cases, the linearized single-difference measurement model can be given as follows.

$$SD = \hat{u}_{SV} C_n^e \left[ T_0 \vec{R}_0 + \frac{\partial T}{\partial \phi} \Big|_0 + \vec{R}_0 \Delta \phi - \frac{\partial T}{\partial \phi} \Big|_0 \right. \quad (4)$$
$$\left. + \vec{R}_0 \Delta \theta + \frac{\partial T}{\partial \psi} \Big|_0 \vec{R}_0 \Delta \psi + T_0 \Delta \vec{R}_S + k_\| T_0 \vec{R}_{0,\|} + k_\perp T_0 \vec{R}_{0,\perp} \right] + \lambda N'_{real}$$

Here, $N_{real}'$ is the single-difference real-valued ambiguity. Note that the linearization error and unmodeled error $\varepsilon_{CP}$ are suppressed in this and subsequent equations for ease of notation. In this linearization, the survey error drops out of the expansion product. This matches intuition since an expansion coefficient k and survey error $\Delta \vec{R}_S$ are small, so their product is negligible. That is, the small survey error has little impact on the overall expansion estimation. Letting $SD_0 = \hat{u}_{SV} C_n^e T_0 \vec{R}_0$ and $SD_{res} = SD - SD_0$, this model becomes the following.

$$SD_{res} = \hat{u}_{SV} C_n^e \left[ \frac{\partial T}{\partial \phi} \Big|_0 + \vec{R}_0 \Delta \phi + \frac{\partial T}{\partial \theta} \Big|_0 \right. \quad (5)$$
$$\left. + \vec{R}_0 \Delta \theta + \frac{\partial T}{\partial \psi} \Big|_0 \vec{R}_0 \Delta \psi + T_0 \Delta \vec{R}_S + k_\| T_0 \vec{R}_{0,\|} + k_\perp T_0 \vec{R}_{0,\perp} \right] + \lambda N'_{real}$$

The linearized double-difference measurement model between a key satellite and satellite index j can be expressed as follows.

$$DD_{res}^j = \quad (6)$$
$$SD_{res}^{key} - SD_{res}^j = (\hat{u}_{SV,key} - \hat{u}_{SV}) C_n^e \left[ \frac{\partial T}{\partial \phi} \Big|_0 \vec{R}_0 \Delta \phi + \frac{\partial T}{\partial \theta} \Big|_0 \vec{R}_0 \Delta \theta + \frac{\partial T}{\partial \psi} \Big|_0 \right.$$
$$\left. \vec{R}_0 \Delta \psi + T_0 \Delta \vec{R}_S + k_\| T_0 \vec{R}_{0,\|} + k_\perp T_0 \vec{R}_{0,\perp} \right] + \lambda N$$

Here, N is now the double-difference integer-valued ambiguity. For these unknowns, this model induces a system of equations, which can have the following form.

$$\overrightarrow{DD}_{res} = G \begin{pmatrix} \Delta\phi \\ \Delta\theta \\ \Delta\psi \\ k_\| \\ k_\perp \\ \vec{N} \end{pmatrix} \quad (7)$$

Here, the $j^{th}$ row of G is populated by the coefficients of the double-difference model. This can be written explicitly as follows.

$$G_j = \left[ (\hat{u}_{SV,key} - \hat{u}_{SV}) \right. \quad (8)$$

$$\left. C_n^e \left[ \frac{\partial T}{\partial \phi} \vert_0 \vec{R}_0, \frac{\partial T}{\partial \theta} \vert_0 \vec{R}_0 \frac{\partial T}{\partial \psi} \vert_0 \vec{R}_0, T_0 \chi(j), T_0 \vec{R}_{0,\|}, T_0 \vec{R}_{0,\perp} \right], \lambda_{(d)} \right]$$

Here, $\chi(j)$ is an indicator function defined as follows. When j corresponds to the assumed errored receiver baseline, $\chi(j)=1$. If j does not correspond to an assumed errored receiver baseline, $\chi(j)=0$. For ease of notation, $\lambda_{(d)}$ denotes $\lambda$ in the appropriate $d^{th}$ column with zeroes around it.

This formulation is an observation model for a particular moment in time. While the equations can be solved as-is, these equations can be further improved by including additional constraints based on the physical nature of the problem. For example, the ambiguity term is constant over time, so it is a common variable over the observations, provided that there are no carrier phase discontinuities (such as cycle slips). If other information is available, such as orientation rates of the IMU 130 or satellite signal Doppler measurements, the other information can be incorporated into the system of equations. In addition, the observations over time may be linked together to form a global optimization problem, which can be solved for all states simultaneously while respecting their included relationships. Inclusion of these features tends to stabilize and improve the accuracy of the final solutions and resist the effect of measurement anomalies. Expressed as an optimization problem, let G(X) represent the measurement observation model for a state X, and let $(X_i, Y_i)$ be the state to be estimated and the associated observation, respectively, at time index i. The objective function may be given as follows.

$$F(X) = \sum_i \| Y_i - G(X_i) \|^2 \quad (9)$$

Here, $X = (X_1, X_2, \ldots, X_N)$. The desired solution is a state $\hat{X}$ such that F(X) is minimised. More precisely, this can be expressed as follows.

$$\hat{X} = \text{argmin}_X F(X) \quad (10)$$

If desired, other relations may be included in the objective function. For example, some relations may be included to attempt to automatically detect and remove outliers. Following this example, let $Z = (Z_1, Z_2, \ldots, Z_N)$ be an auxiliary state to be estimated within the relation R(X, Z). Here, the objective function may take a form such as the following.

$$F(X, Z) = \Sigma_i \| Y_i - G(X_i) \|^2 + \Sigma_i \| R(X_i, Z_i) \|^2 \quad (11)$$

Here, the desired solution can be given as follows.

$$(\hat{X}, \hat{Z}) = \text{argmin}_{X,Z} F(X, Z) \quad (12)$$

In step 314, a report is generated. If the survey is completely correct, the blunder vector can be a value close to zero. If the selected receiver survey was blundered, the blunder vector estimate can show a significant nonzero value. For example, the nonzero value can represent more than a one centimeter error in one or more of an x-plane, y-plane, or z-plane. That value can be used to correct the survey, such as in the following manner.

$$R_{corrected} = R_{surveyed} - \Delta R_{blunder} \quad (13)$$

If necessary, the process can return to step 306 in which another target receiver 206 is selected, and the process can be iteratively repeated until either (i) each receiver 202-208 has been validated or corrected or (ii) the survey is declared in error, requiring a new survey to be performed.

Note that this process 300 can be run during installation, but it can also be run periodically, such as when the ship is underway or returns to port. This process 300 can detect GNSS antenna position disturbances, such as an accidental bump to the GNSS antenna or mount. In some implementations, such as on a large ship with approximately seventy meters of separation between clusters of GNSS receivers, using differential GNSS algorithms over a long twelve to twenty-four hour period can be shown to generate a blunder vector with less than two centimeters of accuracy, meaning that survey blunders of about three centimeters or greater can be consistently detected. Of course, other implementations with other results are possible.

Although FIG. 3 illustrates one example of a process 300 for survey validation, various changes may be made to FIG. 3. For example, while shown as a series of steps, various steps in FIG. 3 could overlap, occur in parallel, occur in a different order, or occur multiple times.

Figure 4A:
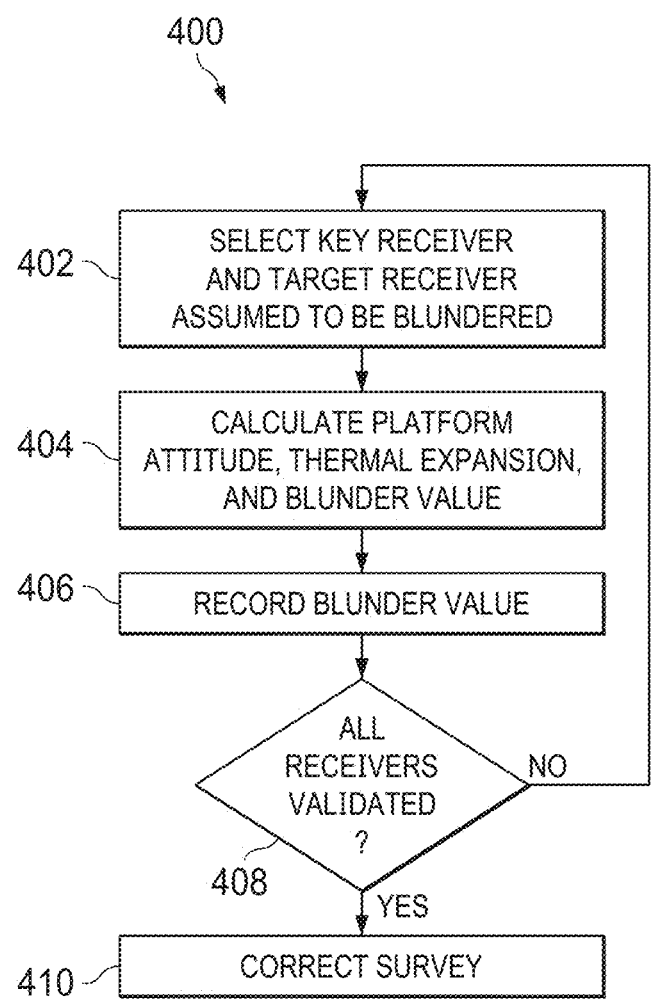

FIGS. 4A and 4B illustrate an example method for survey validation and related results according to this disclosure. In particular, FIG. 4A illustrates an example method 400 for survey validation, and FIG. 4B illustrates an example graph 420 of the survey validation. For ease of explanation, the method 400 is described with respect to the platform 200 of FIG. 2. However, the method 400 could be used with any other suitable platform and any other suitable system.

In some implementations, a dynamic platform includes five receivers in a 2×2×1 grouping. In the example shown in FIGS. 4A and 4B, the receivers are denoted as ABCDE in the grouping A-BC-DE. In step 402, receiver A is selected to be the key or reference receiver, and receiver B is selected as the target receiver that is assumed to be blundered. For example, a baseline AB 422 is assumed to be in error here. In step 404, a platform attitude, a thermal expansion, and a blunder value are calculated using a differential GPS calculator, such as a task-specific processor or computer applying differential calculations. Based on the differential GPS calculations, the vectors AC 424, AD 426, and AE 428 may be formed, which would constitute an essentially triangular shape. From these vectors, original differential GNSS equations are used to estimate the platform roll-pitch-yaw, thermal expansion, and a blunder value on receiver B over the collected data. The blunder value on receiver B is recorded in step 406. In step 408, a determination is made regarding whether each of the receivers has been checked. For example, the method 400 can perform another iteration in which receiver C is selected as the target assumed blundered in step 402. The blunder value on receiver C is calculated in step 404 and recorded in step 406. This continues until results for receivers BCDE are recorded.

If any of the survey values is blundered, the receiver will stand out in the corresponding receiver blunder value. The receiver blunder value is used to correct the survey in step 410. If there is a problem on multiple receivers, the respective blunder values may be large for multiple receivers, which may lead to a declaration that the survey is corrupt and indicating that a new survey may be necessary.

In the method 400, each time a receiver baseline (such as AB 422) is marked as blundered, the remaining receiver baselines (AC 424, AD 426, and AE 428) form a wide triangular shape, or more generally a wide non-degenerate polygon. If the remaining receivers do not make this shape, the platform orientation or expansion may not be resolvable due to poor or no observability into one or more variables being estimated. Therefore, the marked receiver baseline (AB 422) cannot be isolated. That is, a polygonal redundancy in the receiver layout may be beneficial for this process to be effective.

Although FIGS. 4A and 4B illustrate one example of a method 400 for survey validation and related results, various changes may be made to FIGS. 4A and 4B. For example, while shown as a series of steps, various steps in FIG. 4A could overlap, occur in parallel, occur in a different order, or occur multiple times. Additionally, different graphical examples could be used in FIG. 4B.

Figure 5:
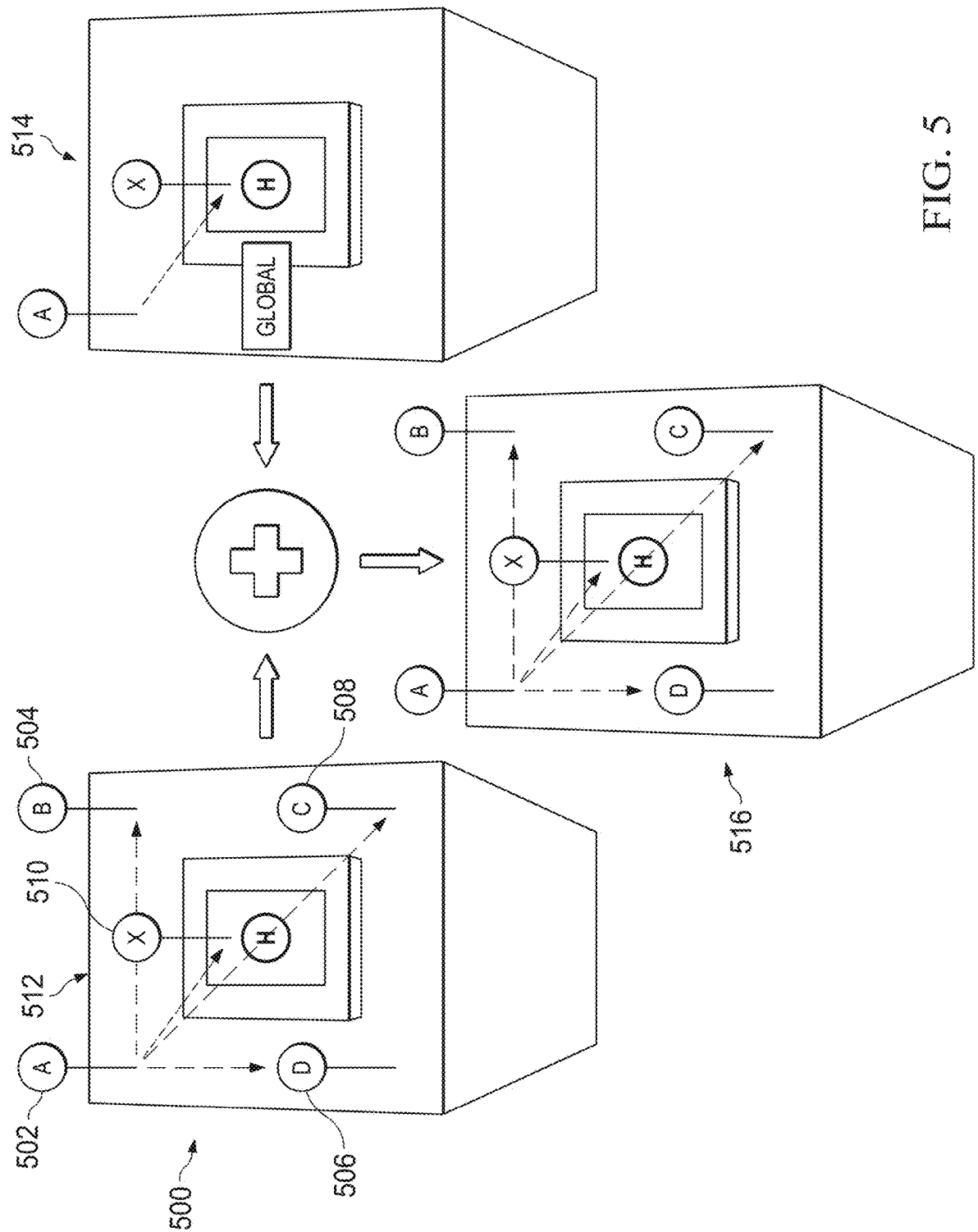
FIG. 5 illustrates an example survey extension process according to this disclosure.

FIG. 5 illustrates an example survey extension process according to this disclosure. In the example shown in FIG. 5, a dynamic platform 500 is a 50 m×50 m square building rooftop arranged for rotorcraft landings with correctly surveyed GNSS receivers 502-508 on the corners named ABCD. The GNSS receivers 502-508 have been set up on the dynamic platform 500 in a wide polygonal shape, and it may be desired to install and locate a new piece of equipment, such as a new GNSS receiver 510, at position X on the dynamic platform 500.

From the existing GNSS receivers 502-508, receiver A 502 is selected as the key receiver to be used in subsequent differential GNSS calculations to calculate a standard differential GNSS baseline AX 514 over time to obtain global coordinates. The differential GNSS calculations are also used to form vectors AB, AC, and AD, which will be used in the roll-pitch-yaw and building thermal expansion coefficients. The dynamic platform 500 roll-pitch-yaw is used to rotate these coordinates into the dynamic platform body frame 512, and the thermal expansion coefficients are used to scale the collection of AX 514 baselines to be consistent with the original coordinates of the existing GNSS receivers 502-508.

After solving for the AX 514 baseline over time, the body coordinates of receiver A 502 plus the final value of AX 514 form the completed survey of the new GNSS receiver 510. This may be expressed as follows.

$$R_X = R_A + \Delta R_{AX} \quad (14)$$

Solving for the baseline using all available data produces a final baseline 516, which includes the new GNSS receiver 510 as if the new GNSS receiver 510 was surveyed at the same time as the existing GNSS receivers 502-508. For additional refinement, this new GNSS receiver 510 may be marked as blundered and run through survey validation.

Although FIG. 5 illustrates one example of a survey extension process, various changes may be made to FIG. 5. For example, similar processes may occur for any other suitable receivers on any other suitable platforms.

Figure 6:
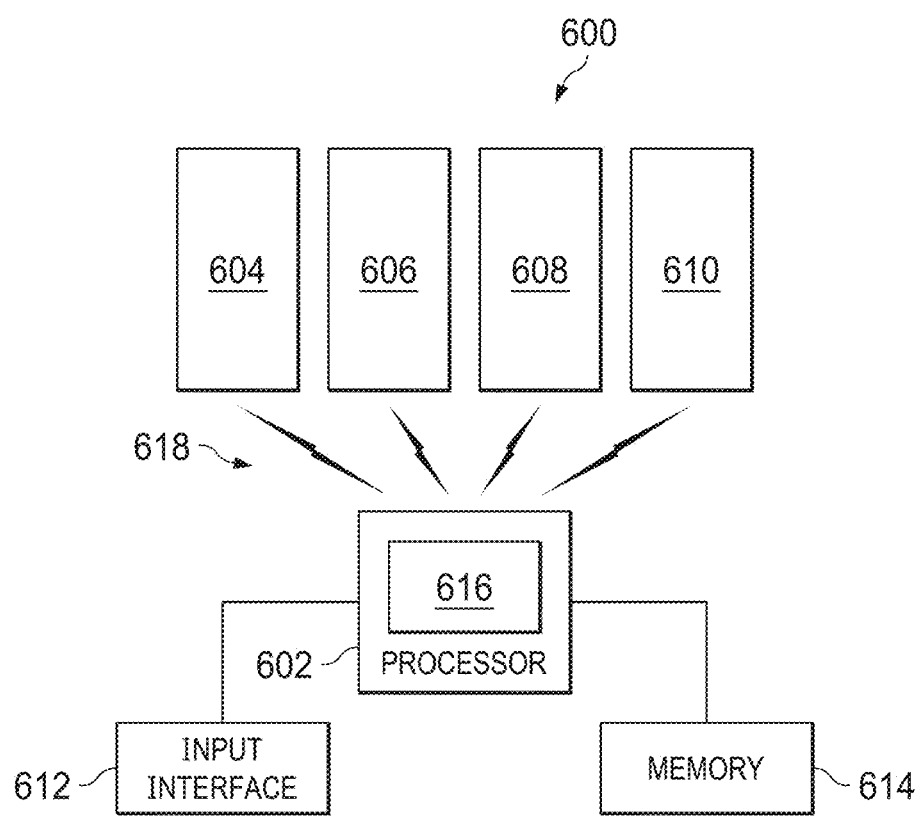
FIG. 6 illustrates an example survey validation system according to this disclosure.

FIG. 6 illustrates an example survey validation system 600 according to embodiments of the present disclosure. In the example shown in FIG. 6, a differential calculator 602 is configured to validate an initial survey of multiple receivers 604-610 on a dynamic platform. The differential calculator 602 can include a task-specific processor, processing circuitry, computer, or other structure configured to apply differential calculations to validate the initial survey. The differential calculator 602 can include an input interface 612 configured to receive coordinate values for each of the receivers 604-610 in the initial survey. Depending on the implementation, the input interface 612 can be a keyboard and display, a touchscreen, or other input mechanism(s) configured to receive user input values. In some embodiments, the initial survey is stored in a memory 614 coupled to the differential calculator 602. The differential calculator 602 also includes a second interface 616 configured to receive multiple sensor readings from each of the receivers 604-610 over a period. The interface 616 can receive the multiple sensor readings via a wired or wireless communication medium 618. In some embodiments, the multiple sensor readings are stored in a database in the memory 614.

The differential calculator 602 is configured to retrieve or receive the initial survey and multiple sensor readings. After selecting one of the receivers 604-610 to be a key receiver 604, the differential calculator 602 assumes that a second of the receivers 604-610 is blundered. A differential analysis is performed to compute a platform attitude, a thermal expansion, and a blunder value for the second receiver 606. Based on the differential analysis, baselines between the key receiver 604 and each of the remaining receivers 606-610 are formed. From these vectors, original differential GNSS equations are used to estimate the platform roll-pitch-yaw, thermal expansion, and a blunder value on a second receiver 606 over the collected data. The differential calculator 602 stores the blunder value for the second receiver 606 in the memory 614. The differential calculator 602 repeats the process until an error value is computed for each of the receivers 604-610. These operations may be performed as described above.

In some embodiments, the differential calculator 602 is configured to add an additional receiver to the initial survey. For example, the differential calculator 602 may be configured to (i) determine a baseline between the key receiver 604 and a new receiver and (ii) associate the baseline to a coordinate frame of the initial survey. These operations may also be performed as described above.

Although FIG. 6 illustrates one example of a survey validation system 600, various changes may be made to FIG. 6. For example, the system 600 may include any number of receivers 604-610. Also, various components in the system 600 may be combined, further subdivided, replicated, rearranged, or omitted and additional components may be added according to particular needs. In addition, while FIG. 6 illustrates one example processing system in which survey and sensor data can be processed, this functionality may be used in any other suitable system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining an initial survey of multiple receivers located on a dynamic platform;
   obtaining sensor readings from the multiple receivers; and
   validating, using a differential calculator, the initial survey by:
      selecting a reference receiver and a target receiver from among the multiple receivers; and
      calculating, based on the sensor readings and baselines between the reference receiver and one or more remaining receivers, a platform attitude, platform thermal expansion state, and survey error values corresponding to the target receiver.

2. The method of claim 1, further comprising:
   in response to the survey error values exceeding threshold values, correcting a coordinate value of the target receiver based on the survey error values.

3. The method of claim 1, wherein calculating the platform attitude and the survey error values comprises performing least-squares ambiguity decorrelation adjustment (LAMBDA) calculations.

4. The method of claim 1 wherein calculating the platform attitude, the platform thermal expansion state, and the survey error values comprises simultaneously estimating (i) the platform attitude, (ii) the platform thermal expansion state, (iii) the survey error values, and (iv) a carrier phase measurement ambiguity.

5. The method of claim 1, further comprising:
   iteratively selecting the reference and target receivers and calculating the platform attitude, the platform thermal expansion state, and the survey error values for each receiver among the multiple receivers.

6. The method of claim 1, further comprising:
   after validating the initial survey, adding a new receiver to the initial survey by (i) determining a baseline between the reference receiver and the new receiver and (ii) associating the baseline to a coordinate frame of the initial survey.

7. The method of claim 1, wherein the multiple receivers comprise global navigation satellite system (GNSS) receivers.

8. A non-transitory computer readable medium containing instructions that when executed cause at least one processor to:
   obtain an initial survey of multiple receivers located on a dynamic platform;
   obtain sensor readings from the multiple receivers; and
   validate, using a differential calculator, the initial survey;
   wherein the instructions that when executed cause the at least one processor to validate the initial survey comprise instructions that when executed cause the at least one processor to:
      select a reference receiver and a target receiver from among the multiple receivers; and
      calculate, based on the sensor readings and baselines between the reference receiver and one or more remaining receivers, a platform attitude, platform thermal expansion state, and survey error values corresponding to the target receiver.

9. The non-transitory computer readable medium of claim 8, further containing instructions that when executed cause the at least one processor to:
   in response to the survey error values exceeding threshold values, correct a coordinate value of the target receiver based on the survey error values.

10. The non-transitory computer readable medium of claim 8, wherein the instructions that when executed cause the at least one processor to calculate the platform attitude, the platform thermal expansion state, and the survey error values comprise:

instructions that when executed cause the at least one processor to perform least-squares ambiguity decorrelation adjustment (LAMBDA) calculations.

11. The non-transitory computer readable medium of claim 8, wherein the instructions that when executed cause the at least one processor to calculate the platform attitude, the platform thermal expansion state, and the survey error values comprise:
instructions that when executed cause the at least one processor to calculate the platform attitude, the platform thermal expansion state, and the survey error values by simultaneously estimating (i) the platform attitude, (ii) the platform thermal expansion state, (iii) the survey error values, and (iv) a carrier phase measurement ambiguity.

12. The non-transitory computer readable medium of claim 8, wherein the instructions that when executed cause the at least one processor to calculate the platform attitude, the platform thermal expansion state, and the survey error values comprise:
instructions that when executed cause the at least one processor to iteratively select the reference and target receivers and calculate the platform attitude, the platform thermal expansion state, and the survey error values for each receiver among the multiple receivers.

13. The non-transitory computer readable medium of claim 8, further containing instructions that when executed cause the at least one processor to:
after validating the initial survey, add a new receiver to the initial survey by (i) determining a baseline between the reference receiver and the new receiver and (ii) associating the baseline to a coordinate frame of the initial survey.

14. The non-transitory computer readable medium of claim 8, wherein the multiple receivers comprise global navigation satellite system (GNSS) receivers.

15. A device comprising:
at least one processing device configured to:
obtain an initial survey of multiple receivers located on a dynamic platform;
obtain sensor readings from the multiple receivers; and
validate, using a differential calculator, the initial survey;
wherein, to validate the initial survey, the at least one processing device is configured to:
select a reference receiver and a target receiver from among the multiple receivers; and
calculate, based on the sensor readings and baselines between the reference receiver and one or more remaining receivers, a platform attitude, platform thermal expansion state, and survey error values corresponding to the target receiver.

16. The device of claim 15, wherein the at least one processing device is further configured, in response to the survey error values exceeding threshold values, to correct a coordinate value of the target receiver based on the survey error values.

17. The device of claim 15, wherein, to calculate the platform attitude, the platform thermal expansion state, and the survey error values, the at least one processing device is configured to perform least-squares ambiguity decorrelation adjustment (LAMBDA) calculations.

18. The device of claim 15, wherein the at least one processing device is further configured to iteratively select the reference and target receivers and calculate the platform attitude, the platform thermal expansion state, and the survey error values for each receiver among the multiple receivers.

19. The device of claim 15, wherein the at least one processing device is further configured, after validating the initial survey, to add a new receiver to the initial survey by (i) determining a baseline between the reference receiver and the new receiver and (ii) associating the baseline to a coordinate frame of the initial survey.

20. The device of claim 15, wherein the multiple receivers comprise global navigation satellite system (GNSS) receivers.

* * * * *